US012183518B2

(12) United States Patent
Fukui

(10) Patent No.: US 12,183,518 B2
(45) Date of Patent: *Dec. 31, 2024

(54) ELECTROLYTIC CAPACITOR AND METHOD FOR PRODUCTION THEREOF

(71) Applicant: Panasonic Intellectual Property Management Co., Ltd., Osaka (JP)

(72) Inventor: Hitoshi Fukui, Nara (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/450,206

(22) Filed: Aug. 15, 2023

(65) Prior Publication Data
US 2023/0386757 A1    Nov. 30, 2023

Related U.S. Application Data

(63) Continuation of application No. 17/416,549, filed as application No. PCT/JP2020/001435 on Jan. 17, 2020, now Pat. No. 11,769,637.

(30) Foreign Application Priority Data

Jan. 25, 2019  (JP) ................... 2019-010757

(51) Int. Cl.
H01G 9/028    (2006.01)
H01G 9/15     (2006.01)

(52) U.S. Cl.
CPC .............. H01G 9/028 (2013.01); H01G 9/15 (2013.01)

(58) Field of Classification Search
CPC .................. H01G 9/028; H01G 9/15
See application file for complete search history.

(56) References Cited

U.S. PATENT DOCUMENTS

| | | | |
|---|---|---|---|
| 11,062,853 B2 | 7/2021 | Miyamoto | |
| 11,189,430 B2 | 11/2021 | Fukui et al. | |
| 11,769,637 B2 * | 9/2023 | Fukui | H01G 9/028 361/528 |
| 2014/0185192 A1 | 7/2014 | Sugawara et al. | |
| 2015/0255221 A1 | 9/2015 | Asteman et al. | |
| 2018/0208713 A1 | 7/2018 | Scheel et al. | |

(Continued)

FOREIGN PATENT DOCUMENTS

| | | |
|---|---|---|
| CN | 104662628 A | 5/2015 |
| CN | 107001598 A | 8/2017 |

(Continued)

OTHER PUBLICATIONS

International Search Report of PCT application No. PCT/JP2020/001435 dated Apr. 7, 2020.

(Continued)

Primary Examiner — Dion R. Ferguson
(74) Attorney, Agent, or Firm — Rimon P.C.

(57) ABSTRACT

An electrolytic capacitor includes an anode body, a dielectric layer disposed on the anode body, and a solid electrolyte layer disposed on the dielectric layer. The solid electrolyte layer includes a first layer and a second layer disposed on the first layer. The first layer contains a first conductive polymer. And the second layer contains a second conductive polymer that is a self-doped conductive polymer.

20 Claims, 2 Drawing Sheets

(56) References Cited

U.S. PATENT DOCUMENTS

| | | |
|---|---|---|
| 2018/0330888 A1 | 11/2018 | Shi et al. |
| 2020/0082994 A1 | 3/2020 | Fukui |
| 2020/0168404 A1 | 5/2020 | Fukui et al. |
| 2020/0373089 A1 | 11/2020 | Shi et al. |
| 2021/0065994 A1 | 3/2021 | Andoralov et al. |
| 2021/0125788 A1 | 4/2021 | Miyamoto |
| 2022/0084756 A1 | 3/2022 | Fukui |

FOREIGN PATENT DOCUMENTS

| | | |
|---|---|---|
| JP | 2007-184318 A | 7/2007 |
| JP | 2011-192983 A | 9/2011 |
| JP | 2013-081099 A | 5/2013 |
| JP | 2014-127682 A | 7/2014 |
| JP | 2015-532525 A | 11/2015 |
| WO | 2007/001076 A1 | 1/2007 |
| WO | 2018/020985 A1 | 2/2018 |
| WO | 2018/221096 A1 | 12/2018 |
| WO | 2018/235434 A1 | 12/2018 |
| WO | 2020/040851 A1 | 2/2020 |
| WO | 2021/018999 A1 | 2/2021 |
| WO | 2022/254012 A1 | 12/2022 |

OTHER PUBLICATIONS

English Translation of Chinese Office Action dated Apr. 12, 2022 for the related Chinese Patent Application No. 202080009867.7.
Non-Final Office Action dated Feb. 13, 2023 issued in U.S. Appl. No. 17/416,549.
Notice of Allowance dated May 23, 2023 issued in U.S. Appl. No. 17/416,549.

* cited by examiner

ELECTROLYTIC CAPACITOR AND METHOD FOR PRODUCTION THEREOF

CROSS-REFERENCE TO RELATED APPLICATIONS

This application is a Continuation of U.S. patent application Ser. No. 17/416,549, filed on Jun. 21, 2021, which is the U.S. National Phase under 35 U.S.C. § 371 of International Patent Application No. PCT/JP2020/001435, filed on Jan. 17, 2020, which claims priority to Japanese Patent Application No. 2019-010757, filed on Jan. 25, 2019, the entire disclosures each of which are hereby incorporated by reference.

TECHNICAL FIELD

The present invention relates to an electrolytic capacitor including a solid electrolyte layer and a method for production of the electrolytic capacitor.

BACKGROUND

An electrolytic capacitor includes a capacitor element provided with a solid electrolyte layer, an electrode terminal electrically connected to the capacitor element, and an exterior body sealing the capacitor element. The capacitor element includes, for example, an anode body, a dielectric layer formed on the anode body, and the solid electrolyte layer formed on the dielectric layer.

The solid electrolyte layer contains a conductive polymer. Japanese Translation of PCT International Application Publication No. JP-T-2013-081099 proposes a solid electrolytic capacitor including a dielectric oxide film formed on a surface of an anode body having pores, and a conductive polymer layer formed inside the pores and containing amines and a water-soluble self-doped conductive polymer having a sulfonic acid group.

SUMMARY

In the electrolytic capacitor, the dielectric layer is usually formed so as to cover a surface of a porous part formed on the anode body. The anode body is connected to an electrode terminal, and the external air may enter the inside of the capacitor element through the porous part of the anode body. When oxygen in the intruded air comes into contact with the solid electrolyte layer, the conductive polymer contained in the solid electrolyte layer might be deteriorated, and equivalent series resistance (ESR) of the electrolytic capacitor may increase or electrostatic capacitance thereof may reduce.

An aspect of the present invention is an electrolytic capacitor that includes an anode body, a dielectric layer disposed on the anode body, and a solid electrolyte layer disposed on the dielectric layer, in which the solid electrolyte layer includes a first layer and a second layer disposed on the first layer. The first layer contains a first conductive polymer. The second layer contains a second conductive polymer that is a self-doped conductive polymer.

Another aspect of the present invention is a method for producing an electrolytic capacitor, the method including: preparing an anode body on which a dielectric layer is disposed; and forming a solid electrolyte layer on the dielectric layer. The forming of the solid electrolyte layer includes: forming a first layer containing a first conductive polymer on the dielectric layer by polymerizing a precursor of the first conductive polymer, and forming a second layer containing a second conductive polymer on the first layer by adhering a liquid composition containing the second conductive polymer to the first layer. And the second conductive polymer is a self-doped conductive polymer.

According to the above invention, even after exposure to a high temperature, an increase in ESR of the electrolytic capacitor including the solid electrolyte layer can be suppressed, and a decrease in electrostatic capacitance can be suppressed.

DESCRIPTION OF EMBODIMENT

Figure 1:
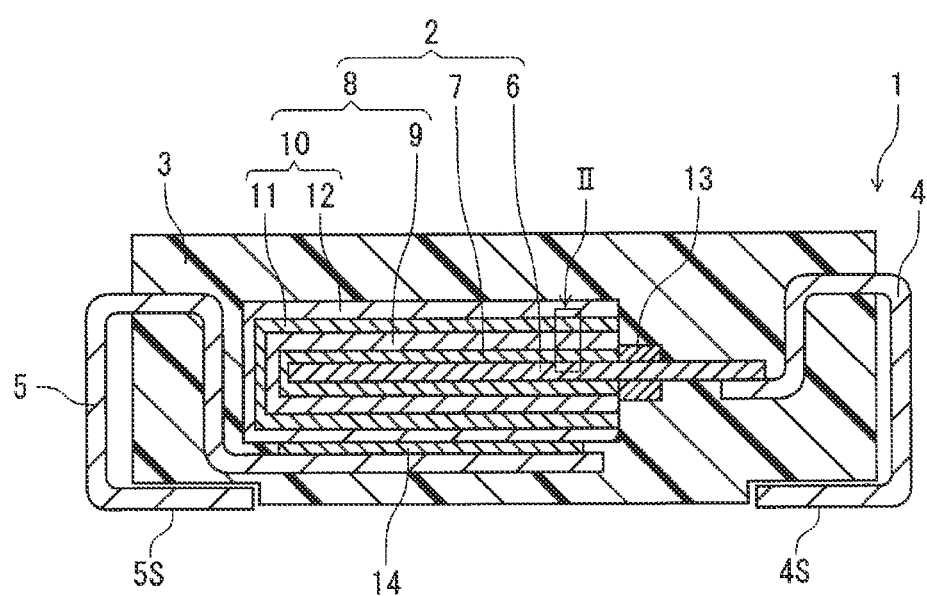
FIG. 1 is a cross-sectional view schematically illustrating an electrolytic capacitor according to one exemplary embodiment of the present invention.

An electrolytic capacitor includes an anode body, a dielectric layer formed on the anode body, and a solid electrolyte layer formed on the dielectric layer. Since the anode body has a large surface area at the surface on which the dielectric layer and the solid electrolyte layer are formed, the anode body usually includes a porous part in the surface region. The porous part includes many voids. One end of the anode body is connected to an electrode terminal, and thus the air may enter into the inside of the capacitor element through the voids of the porous part in the anode body from the electrode terminal side. This may cause deterioration of the conductive polymer included in the solid electrolyte layer. Such deterioration of the conductive polymer becomes remarkable particularly in a high temperature environment.

In the electrolytic capacitor according to one aspect of the present invention, the electrolytic capacitor includes the solid electrolyte layer which includes a first layer and a second layer formed on the first layer. The first layer contains a first conductive polymer, and the second layer contains a second conductive polymer that is a self-doped conductive polymer. By using the self-doped conductive polymer as the second conductive polymer, the second conductive polymer can easily get into the first layer. This is because the self-doped conductive polymer can be stably held in a liquid composition in a state of small particle size compared with the case of a non-self-doped conductive polymer. Hence, even when the first layer has voids, the voids of the first layer can be easily filled with the second conductive polymer. Thus, even when the air enters the capacitor element, the air hardly permeates the solid electrolyte layer. Accordingly, since contact between the solid electrolyte layer and oxygen included in the air can be reduced, deterioration of the conductive polymer is suppressed. As a result, heat resistance of the solid electrolyte layer is improved, and thus heat resistance of the electrolytic capacitor is improved. Hence, an increase in equivalent series resistance (ESR) of the electrolytic capacitor after a heat resistance test can be suppressed. Also, a decrease in electrostatic capacitance of the electrolytic capacitor after the heat resistance test can be suppressed.

The self-doped conductive polymer refers to a conductive polymer having an anionic group directly or indirectly bonded to the skeleton of the conductive polymer by a covalent bond. The anionic group of the conductive polymer itself functions as a dopant of the conductive polymer, and thus is referred to as self-doped. The anionic group includes, for example, an acidic group (acid type) or a conjugated anionic group (salt type) thereof.

Hereinafter, the electrolytic capacitor according to the above aspect of the present invention and a method for producing the electrolytic capacitor are described more specifically with reference to the drawings as necessary.

[Electrolytic Capacitor]

(Anode Body)

The anode body can contain valve metal, an alloy containing valve metal, a compound containing valve metal, and others. These materials may be used singly or in combination of two or more kinds thereof. As the valve metal, for example, aluminum, tantalum, niobium, and titanium are preferably used. The anode body usually includes a porous part in a surface region. The anode body as such is obtained, for example, by roughening a surface of a base material (such as a foil-like or plate-like base material) containing the valve metal by etching or the like. The anode body may be a molded body of particles containing valve metal or a sintered body thereof. Since the sintered body has a porous structure, an entirety of the anode body can be the porous part.

(Dielectric Layer)

The dielectric layer is formed by anodizing the valve metal at the surface of the anode body by an anodizing treatment or the like. The dielectric layer may be formed so as to cover at least a part of the anode body. The dielectric layer is usually formed on the surface of the anode body. Since the dielectric layer is formed on the surface of the anode body in the porous part, the dielectric layer is formed along inner wall surfaces of the pores and cavities (pits) in the porous part of the anode body.

The dielectric layer contains an oxide of the valve metal. For example, when tantalum is used as the valve metal, the dielectric layer contains $Ta_2O_5$, and when aluminum is used as the valve metal, the dielectric layer contains $Al_2O_3$. Note that the dielectric layer is not limited thereto, and any dielectric layer that functions as a dielectric body may be used.

(Solid Electrolyte Layer)

The solid electrolyte layer is formed so as to cover the dielectric layer. The solid electrolyte layer does not necessarily cover an entirety of the dielectric layer (a entire surface of the dielectric layer), and may be formed so as to cover at least a part of the dielectric layer. The solid electrolyte layer includes the first layer and the second layer formed on the first layer. The first layer contains the first conductive polymer, and the second layer contains the second conductive polymer that is the self-doped conductive polymer. When a region where the first layer is not formed exists on the dielectric layer, the second layer may be formed on the dielectric layer in this region.

(First Layer)

Examples of the first conductive polymer include a non-self-doped conductive polymer. In the case of the first layer containing the non-self-doped conductive polymer, the voids are likely to be generated in the first layer. Even in this case, by forming, on the first layer, the second layer containing the second conductive polymer that is the self-doped conductive polymer, the second conductive polymer can get into the first layer, and thus the heat resistance of the solid electrolyte layer can be enhanced.

Examples of the non-self-doped conductive polymer include conductive polymers that do not have an anionic group (specifically, a sulfonic acid group, a carboxy group, a phosphoric acid group, a phosphonic acid group, and salts thereof) directly or indirectly bonded covalently to the skeleton of the conductive polymer.

As the non-self-doped conductive polymer, polypyrrole, polythiophene, polyaniline, and the like are preferable. These may be used singly or in combination of two or more kinds, or may be a copolymer of two or more kinds of monomers. In the present description, polypyrrole, polythiophene, polyaniline, and the like mean polymers having polypyrrole, polythiophene, polyaniline, and the like as a basic skeleton, respectively. Thus, polypyrrole, polythiophene, polyaniline, and the like can also include derivatives thereof (and further, such as substitutes having substituent groups other than the anionic group). For example, polythiophene includes poly (3,4-ethylenedioxythiophene) (PEDOT) and the like. Among the above, in polypyrroles (polypyrrole and derivatives thereof), the voids may be generated in the first layer. Even when the first layer contains the above polypyrroles, since the second layer containing the second conductive polymer is formed on the first layer, the second conductive polymer can get into the first layer, and thus high heat resistance of the solid electrolyte layer can be secured.

A weight average molecular weight of the first conductive polymer is not particularly limited, and is, for example, equal to or more than 1,000 and equal to or less than 1,000,000.

In the present application, the weight average molecular weight is a weight average molecular weight measured by gel permeation chromatography (GPC) on a basis of polystyrene.

The first layer may contain the second conductive polymer that is the self-doped conductive polymer. The second conductive polymer may be contained in the first layer when the first layer is formed, or the second conductive polymer may be contained in the first layer by making the second conductive polymer get into the first layer when the second layer is formed. Examples of the self-doped conductive polymer include those described later.

The first layer may be a single layer or may include a plurality of layers. In the case the first layer including the plurality of layers, the first conductive polymers included in the respective layers may be the same or different.

The first layer can further include a dopant. As the dopant, for example, an anion and/or a polyanion is used.

Examples of the anion include, but are not particularly limited to, a sulfate ion, a nitrate ion, a phosphate ion, a borate ion, and an organic sulfonate ion. Examples of the dopant that generates sulfonate ions include p-toluenesulfonic acid and/or naphthalenesulfonic acid. The anion may be contained in the first layer in the form of a salt.

Examples of the polyanion include, but are not particularly limited to, polyvinylsulfonic acid, polystyrenesulfonic acid, polyallylsulfonic acid, polyacrylsulfonic acid, and/or polymethacrylsulfonic acid. The polyanion may be contained in the first layer in the form of a salt. In the first layer, the anion and/or the polyanion may form a conductive polymer composite together with the first conductive polymer.

Since the dielectric layer is formed along the inner wall surfaces of the pores and pits in the porous part of the anode body as described above, the first layer formed on the dielectric layer is also formed in the porous part of the anode body. A distribution of the first layer in the porous part is not particularly limited, but the first layer may be formed over an entirety of the porous part. Further, the distribution of the first layer may be different between the surface region of the porous part and the inside of the porous part. For example, an amount (an amount per unit volume of the porous part) of the first layer may be smaller in the inside than in the vicinity of the surface of the porous part. Meanwhile, the second layer may be formed on the first layer formed in the porous part. The second layer may be formed (or exist) in the voids of the porous part. In such a case, the air hardly penetrates through the porous part, and thus the effect of suppressing the deterioration of the solid electrolyte layer is enhanced, and an increase in ESR can be further suppressed. Further, the effect of suppressing a decrease in electrostatic capacitance can be further enhanced.

The first layer can be formed by, for example, chemical polymerization and/or electropolymerization of a precursor (e.g., a raw material monomer) of the first conductive polymer. Alternatively, the first layer can be formed by bringing a liquid composition (first liquid composition) containing at least the first conductive polymer into contact with the dielectric layer. In particular, since the electropolymerization is likely to proceed at the surface of the first layer (the surface of the porous part), the first layer tends to be formed densely at the surface of the first layer (the surface of the porous part). On the other hand, since the electropolymerization is not likely to proceed in the inside of the porous part, voids in the first layer tends to be generated in the inside of the porous part. Thus, the air easily enters the capacitor element through the voids in the first layer, and the solid electrolyte layer is easily deteriorated. Even in the case of the first layer being a polymer film formed by electropolymerization in which the voids are likely to be generated as described above, by forming the second layer, the permeation of air can be reduced and the deterioration of the solid electrolyte layer can be suppressed. Hence, particularly when the first layer is formed by the electropolymerization, the effect of forming the second layer (more specifically, making the second conductive polymer get into the first layer) is remarkably exhibited. When the second layer is formed on the polymer film formed by the electropolymerization as the first layer, the amount of the first layer is smaller in the inside than in the vicinity of the surface of the porous part as described above. Further, the second layer is also formed on the first layer formed inside the porous part, and the second layer is formed in a state of entering or filling the voids of the porous part (or the first layer).

(Second Layer)

Examples of the anionic group of the second conductive polymer include a sulfonic acid group, a carboxy group, a phosphate group, a phosphonic acid group, and salts thereof (salts with inorganic bases, salts with organic bases, etc.). The second conductive polymer may have one kind of anionic group or two or more kinds of anionic groups. The anionic group is preferably the sulfonic acid group or the salt thereof, and may be a combination of the sulfonic acid group or the salt thereof and the anionic group other than the sulfonic acid group or the salt thereof. The amount of anionic group contained in the second conductive polymer is, for example, preferably one to three, more preferably one or two (in particular, one) per molecule corresponding to the main skeleton of the second conductive polymer.

Preferable examples of the second conductive polymer include polypyrrole having the anionic group, polythiophene having the anionic group, and polyaniline having the anionic group. These may be used singly or in combination of two or more kinds, or the second conductive polymer may be a copolymer of two or more kinds of monomers. Polypyrrole, polythiophene, polyaniline, and the like may also include derivatives thereof (such as substitutes having substituent groups other than the anionic group in addition to the anionic group). Among them, for example, self-doped PEDOTs (PEDOT and derivatives thereof) are preferable from the viewpoint of further enhancing the effect of suppressing an increase in ESR and a decrease in electrostatic capacitance even after exposure to the high temperature environment.

From the viewpoint of easily getting into the first layer, the weight average molecular weight of the second conductive polymer is preferably equal to or less than 100,000, and more preferably equal to or less than 30,000. The weight average molecular weight of the second conductive polymer is, for example, equal to or more than 1,000. A viscosity of a second liquid composition containing the second conductive polymer is not particularly limited as long as the viscosity is equal to or less than 500 mPa·s under the conditions of 25° C. and rpm when evaluated with a B-type viscometer, and is preferably equal to or less than 300 mPa s, and more preferably equal to or less than 100 mPa s.

The second layer may contain a conductive polymer (such as a non-self-doped conductive polymer) other than the second conductive polymer, but preferably has a large content of the second conductive polymer. A ratio of the second conductive polymer to a total of the conductive polymers contained in the second layer is, for example, equal to or more than 90 mass %, and may be equal to 100 mass %.

Although the second conductive polymer has the anionic group, the second layer may contain a dopant as necessary. As the dopant, for example, an anion and/or a polyanion is used. In the second layer, the anion and/or the polyanion may form a conductive polymer composite together with the conductive polymer. The anion and the polyanion may be selected from those described for the first layer, respectively.

The content ratio of the dopant in the second layer ranges, for example, from 0 parts by mass to 50 parts by mass, inclusive, and preferably from 0 parts by mass to 10 parts by mass, inclusive, or from 0.1 parts by mass to 10 parts by mass, inclusive, with respect to 100 parts by mass of the second conductive polymer.

The second layer may be a single layer or may include a plurality of layers. In the case of the second layer including the plurality of layers, the second conductive polymers included in the respective layers may be the same or different.

The second layer may further contain an alkali as necessary. The alkali can be selected from those exemplified for the first layer.

The solid electrolyte layer may further contain other components as long as the effect of the present invention is not impaired.

Figure 2:
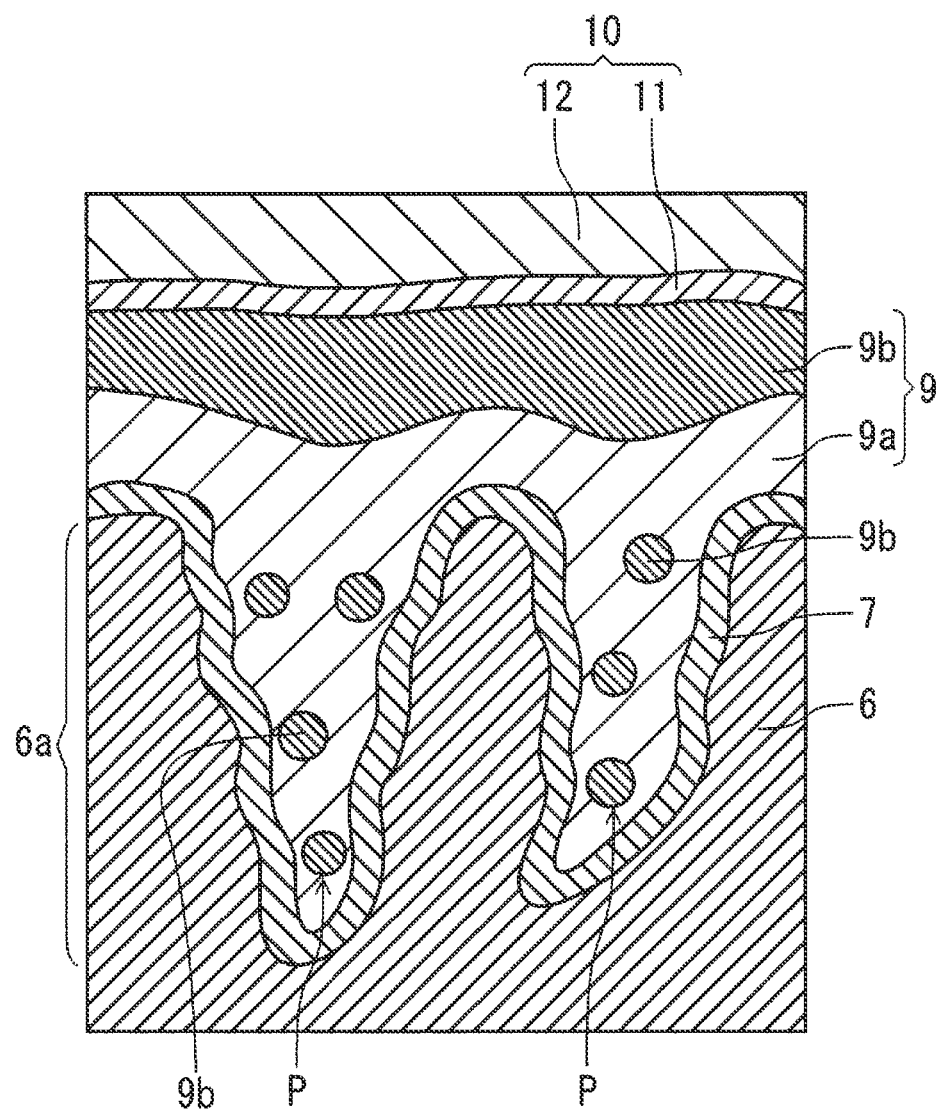
FIG. 2 is a schematic cross-sectional view in which a region II in FIG. 1 is enlarged.

FIG. 1 is a cross-sectional view schematically illustrating a structure of the electrolytic capacitor according to one exemplary embodiment of the present invention. FIG. 2 is an enlarged cross-sectional view schematically illustrating a region II in FIG. 1. Electrolytic capacitor 1 includes capacitor element 2, resin sealing material (exterior body) 3 that seals capacitor element 2, and anode terminal 4 and cathode terminal 5 each of which is at least partially exposed to the outside of resin sealing material 3. Anode terminal 4 and cathode terminal 5 can be made of, for example, metal (such as copper or copper alloy). Resin sealing material 3 has a substantially rectangular parallelepiped outer shape, and electrolytic capacitor 1 also has a substantially rectangular parallelepiped outer shape. As a material of the resin sealing material 3, for example, an epoxy resin can be used.

Capacitor element 2 includes anode body 6, dielectric layer 7 covering anode body 6, and cathode part 8 covering dielectric layer 7. Cathode part 8 includes solid electrolyte layer 9 covering dielectric layer 7, and cathode lead-out layer 10 covering solid electrolyte layer 9. Cathode lead-out layer 10 includes, for example, carbon layer 11 and silver paste layer 12.

Anode body 6 has porous part 6a. Anode body 6 also includes a region facing cathode part 8 and a region not facing cathode part 8. Separation layer 13 having an insulating property is formed on a portion adjacent to cathode part 8 in the region not facing cathode part 8. Separation layer 13 is formed so as to cover a surface of anode body 6 in a band shape, and restricts a contact between cathode part 8 and anode body 6. In the region not facing cathode part 8, a portion other than the portion adjacent to cathode part 8 is electrically connected to anode terminal 4 by welding. Cathode terminal 5 is electrically connected to cathode part 8 via adhesive layer 14 formed of a conductive adhesive.

Main surface 4S of anode terminal 4 and main surface 5S of cathode terminal 5 are exposed from the same surface of resin sealing material 3. The exposed surface is used for, for example, solder connection to a substrate (not shown) on which electrolytic capacitor 1 is to be mounted.

Carbon layer 11 only needs to have conductivity, and can be made of, for example, a conductive carbon material (such as graphite). For silver paste layer 12, for example, a composition containing silver powder and a binder resin (such as epoxy resin) can be used. Cathode lead-out layer 10 is not limited to this configuration, and any of those configured to have a current collecting function may be used.

Solid electrolyte layer 9 is formed so as to cover dielectric layer 7. Dielectric layer 7 is formed along a surface (surface including an inner wall surface of a pore) of anode body 6. On a surface of dielectric layer 7, irregularities corresponding to the shape of the surface of anode body 6 are formed. Solid electrolyte layer 9 is preferably formed so as to fill such irregularities of dielectric layer 7.

Solid electrolyte layer 9 includes first layer 9a formed on dielectric layer 7 and second layer 9b formed on the first layer 9a. First layer 9a contains the first conductive polymer, and second layer 9b contains the second conductive polymer that is the self-doped conductive polymer. First layer 9a is formed (or filled) in porous part 6a of anode body 6, and voids P are included in the first layer 9a. The second conductive polymer gets into the first layer 9a when second layer 9b is formed. Thus, the second conductive polymer enters into voids P in the first layer 9a to form second layer 9b in the voids P. It is noted that, although voids P are schematically shown in the drawing, at least a part of voids P is in a continuous state in the porous part (or in first layer 9a).

The electrolytic capacitor according to the above aspect is not limited to the electrolytic capacitor having the above structure, and can be applied to electrolytic capacitors having various structures. Specifically, the present invention can also be applied to a wound electrolytic capacitor, an electrolytic capacitor using a sintered body of metal powder as an anode body, and the like.

[Method for Producing Electrolytic Capacitor]

The method for producing the electrolytic capacitor according to the above aspect includes a step (first step) of preparing the anode body on which the dielectric layer is disposed, and a step (second step) of forming the solid electrolyte layer on the dielectric layer. The method for producing the electrolytic capacitor may further include a step of preparing the anode body prior to the first step. The method for producing the electrolytic capacitor may further include a step of forming the cathode lead-out layer and/or a step of sealing the capacitor element.

Hereinafter, each step is described in more detail.

(Step of Preparing Anode Body)

In this step, the anode body is formed by a known method according to a kind of anode body.

The anode body can be prepared, for example, by roughening a surface of a foil-like or plate-like base material containing the valve metal. A porous part is formed on a surface layer of the anode body by the roughening. A method for the roughening is not particularly limited as long as irregularities are formed on the surface of the base material, for example, and may be performed by etching (for example, electrolytic etching) the surface of the base material.

Alternatively, valve metal powder is prepared, and in a state that the longitudinal one end side of the anode terminal having a rod shape is embedded in the valve metal powder, the valve metal powder is molded to obtain a molded body having a desired shape (for example, a block shape). The molded body may be sintered to form the anode body having a porous structure in which one end of the anode terminal is embedded.

(First Step)

In the first step, the dielectric layer is formed on the anode body. The dielectric layer is formed by anodizing the anode body. The anodization can be performed by a known method, for example, the anodizing treatment. The anodizing treatment can be performed, for example, by immersing the anode body in an anodizing liquid to impregnate the surface region of the anode body with the anodizing liquid, and applying a voltage between the anode body as an anode and a cathode immersed in the anodizing liquid. As the anodizing liquid, for example, a phosphoric acid aqueous solution or the like is preferably used.

(Second Step) In the second step, the solid electrolyte layer is formed so as to cover at least a part of the dielectric layer. The second step includes, for example, a step of forming the first layer on the dielectric layer and a step of forming the second layer on the first layer.

(Step of Forming First Layer)

The first layer may be formed by bringing the first liquid composition containing the first conductive polymer into contact with the dielectric layer, but is preferably formed by chemical polymerization and/or electropolymerization of a precursor of the first conductive polymer. In particular, when the precursor is polymerized by the electropolymerization to form the first layer containing the first conductive polymer, voids may be formed in the first layer. Thus, in this case, an effect obtained by making the second conductive polymer get into the first layer is likely to be remarkable. In the case of the electropolymerization, a conductive precoat layer may be formed prior to the electropolymerization. The first layer may be formed directly on the dielectric layer or may be formed with the precoat layer interposed therebetween.

As the first liquid composition containing the first conductive polymer, for example, a dispersion liquid (or solution) of the first conductive polymer or a dispersion liquid (or solution) of a conductive polymer composite of the first conductive polymer and a dopant may be used.

In the case of chemical polymerization, for example, the first layer is formed using the first liquid composition containing a precursor of the first conductive polymer, a dispersion medium (or solvent), an oxidizing agent, and a dopant as necessary. The first liquid composition may be attached to the dielectric layer and then heated.

In the case of the electropolymerization, for example, the first layer is formed using the first liquid composition containing a precursor of the first conductive polymer, a dispersion medium (or solvent), and a dopant as necessary.

The first layer is formed, for example, by immersing, in the first liquid composition, the anode body on which the dielectric layer and the precoat layer are formed, and supplying power from a supply electrode using the precoat layer as an electrode. The precoat layer is formed of, for example, a conductive material (such as conductive polymer and inorganic conductive material). The conductive material constituting the precoat layer is not particularly limited, and for example, a known material can be used.

As the first conductive polymer and the dopant, those exemplified above can be used. Examples of the precursor of the first conductive polymer include a monomer constituting the first conductive polymer and/or an oligomer in which some monomers are linked. Examples of the dispersion medium (or solvent) include water, an organic solvent, and a mixture thereof. Examples of the organic solvent include a monohydric alcohol (methanol, ethanol, propanol, etc.), a polyhydric alcohol (ethylene glycol, glycerin, etc.), and an aprotic polar solvent (N, N-dimethylformamide, dimethylsulfoxide, acetonitrile, acetone, benzonitrile, etc.). The first liquid composition may further contain an alkali and/or other components.

(Step of Forming Second Layer)

The second layer is formed on the first layer by, for example, attaching, to the first layer, the second liquid composition containing the second conductive polymer that is the self-doped conductive polymer. The second layer can be formed, for example, by immersing, in the second liquid composition, the anode body in which the first layer is formed on the dielectric layer, or applying or dropping the second liquid composition to the anode body in which the first layer is formed on the dielectric layer, and then drying the second liquid composition.

The second liquid composition contains the second conductive polymer, a dispersion medium (or solvent), and a dopant as necessary. As the second conductive polymer and the dopant, those exemplified above can be used. As the dispersion medium (or solvent), those exemplified for the first liquid composition can be used. The second liquid composition may further contain an alkali and/or other components.

As the second liquid composition, for example, a dispersion liquid (or solution) of the second conductive polymer or a dispersion liquid (or solution) of a conductive polymer composite of the second conductive polymer and the dopant may be used. The second liquid composition can be obtained, for example, by oxidatively polymerizing a precursor of the second conductive polymer in the dispersion medium (or solvent). Examples of the precursor include a monomer constituting the second conductive polymer and/or an oligomer in which some monomers are linked. The second liquid composition containing the conductive polymer composite can be obtained by oxidatively polymerizing the precursor of the second conductive polymer in the dispersion medium (or solvent) in the presence of the dopant.

The average particle size of particles of the second conductive polymer (or conductive polymer composite) dispersed in the second liquid composition is, for example, equal to or less than 800 nm. From the viewpoint of easily making the second conductive polymer get into the first layer, the average particle size is preferably equal to or less than 300 nm, and more preferably equal to or less than 100 nm. The lower limit of the average particle size is not particularly limited, but is, for example, equal to or more than 5 nm.

In the present application, the average particle size of the conductive polymer (or the conductive polymer composite) can be determined, for example, from a particle size distribution obtained by a dynamic light scattering method.

(Step of Forming Cathode Lead-Out Layer)

In this step, the cathode lead-out layer is formed by sequentially laminating a carbon layer and a silver paste layer on the solid electrolyte layer formed in the second step. The capacitor element can be obtained by forming the cathode lead-out layer.

The conductive adhesive layer is disposed on the surface of the cathode lead-out layer, and one end of the cathode terminal is electrically connected to the capacitor element via the adhesive layer. As the cathode terminal, an electrode terminal used in the electrolytic capacitor can be used without particular limitation, and for example, a terminal called a lead frame may be used.

(Step of Sealing Capacitor Element with Resin Sealing Material)

The capacitor element thus formed is sealed with a resin material together with, for example, a part of each of anode terminal 4 and cathode terminal 5. By this sealing, resin sealing material 3 is formed. The resin material is preferably a thermosetting resin (such as epoxy resin) or a resin composition. Resin sealing material 3 contains a cured product of a thermosetting resin or a resin composition.

EXAMPLES

Hereinafter, the present invention is specifically described with reference to Example and Comparative Examples, but the present invention is not limited to the following examples.

Example 1

Electrolytic capacitor 1 shown in FIG. 1 was produced in the following manner, and its characteristics were evaluated.

(1) Step of Preparing Anode Body

An aluminum foil (thickness: 100 μm) was prepared as a base material, and a surface of the aluminum foil was subjected to an etching treatment to obtain anode body 6.

(2) Step of Forming Dielectric Layer 7

Anode body 6 was immersed in a phosphoric acid solution (liquid temperature: 70° C.) having a concentration of 0.3 mass %, and a direct-current voltage of 70 V was applied for 20 minutes to form dielectric layer 7 containing aluminum oxide ($Al_2O_3$) on a surface of anode body 6. Thereafter, an insulating resist tape (separation layer 13) was attached to a predetermined portion of anode body 6.

(3) Step of Forming First Layer

An aqueous dispersion (first liquid composition) containing pyrrole and a dopant (naphthalenesulfonic acid) was prepared. The concentration of the pyrrole in the first liquid composition was 2 mass %, and the concentration of the dopant was 10 mass %.

Anode body 6 on which dielectric layer 7 was formed was immersed in a liquid composition containing a conductive material to form the precoat layer. Anode body 6 on which dielectric layer 7 and the precoat layer were formed was immersed in a first liquid composition, and the electropolymerization of pyrrole was progressed using the precoat layer as an electrode to form the first layer containing polypyrrole as the first conductive polymer.

(4) Step of Forming Second Layer

An aqueous dispersion (second liquid composition) containing the second conductive polymer was prepared. The concentration of the second conductive polymer in the second liquid composition was 4 mass %, and the average particle size of the second conductive polymer was 100 nm. As the second conductive polymer, PEDOT having a sulfonic acid group directly bonded to a PEDOT skeleton was used.

Anode body 6 on which first layer 9a was formed was immersed in the second liquid composition, and then dried at 120° C. for 10 to 30 minutes to form second layer 9b. At this time, the second liquid composition infiltrates into first layer 9a, which causes voids P formed in first layer 9a to also be filled with the second conductive polymer, and as a result, the second layer containing the second conductive polymer was formed in voids P of the first layer.

In this way, solid electrolyte layer 9 including first layer 9a and second layer 9b was formed.

(5) Step of Forming Cathode Lead-Out Layer A dispersion liquid in which graphite particles were dispersed in water was applied to the surface of solid electrolyte layer 9, and then dried to form carbon layer 11.

Then, a silver paste containing silver particles and a binder resin (epoxy resin) was applied onto the surface of carbon layer 11, and then the binder resin was cured by heating to form silver paste layer 12. Cathode lead-out layer 10 composed of carbon layer 11 and silver paste layer 12 was thus formed. In this way, capacitor element 2 was obtained.

(6) Assembly of Electrolytic Capacitor

Anode terminal 4, cathode terminal 5, and adhesive layer 14 were further disposed on capacitor element 2, and sealed with resin sealing material 3 to produce the electrolytic capacitor.

Comparative Example 1

The electrolytic capacitor was produced in the same manner as in Example 1 except that the second layer was not formed.

Comparative Example 2

As the second liquid composition for forming the second layer, an aqueous dispersion of PEDOT doped with polystyrene sulfonic acid (PSS) as a non-self-doped conductive polymer was used. The concentration of the conductive polymer in the second liquid composition was 4 mass %, and the average particle size of the conductive polymer was 400 nm. The electrolytic capacitor was produced in the same manner as in Example 1 except for these.

[Evaluation]

Electrostatic capacitance and ESR with respect to the electrolytic capacitor of each of Example and Comparative Examples, which were produced above, were evaluated by the following procedure.

Under an environment of 20° C., an initial electrostatic capacitance value C0 (μF) and an initial ESR value X0 (mΩ) at a frequency of 100 kHz with respect to the electrolytic capacitor were measured using an LCR meter for four-terminal measurement. Next, a rated voltage was applied to the electrolytic capacitor at a temperature of 145° C. for 125 hours (heat resistance test). Thereafter, the electrostatic capacitance value C1 (μF) and the ESR value X1 (mΩ) were measured in the same manner as described above. Then, a value obtained by subtracting the initial electrostatic capacitance value C0 from the electrostatic capacitance value C1 was divided by the initial electrostatic capacitance value C0 and multiplied by 100 to obtain a change rate in the electrostatic capacitance. And a value obtained by subtracting the initial ESR value X0 from the ESR value X1 was divided by the initial ESR value X0 and multiplied by 100 to obtain a change rate in the ESR. A ratio (relative value) of the change rate with respect to the change rate in Comparative Example 1 was obtained for each of Example 1 and Comparative Examiner 2 in the case of assuming that the change rate in Comparative Example 1 was 100. The ratio was used as an index for evaluation of the electrostatic capacitance and the ESR.

The results are shown in Table 1. In Table 1, Example 1 is represented by A1, and Comparative Examples 1 and 2 are represented by R1 and R2, respectively.

TABLE 1

|    | Change rate in ESR | Change rate in electrostatic capacitance |
|----|---|---|
| A1 | 76.2  | 92.3  |
| R1 | 100   | 100   |
| R2 | 114.2 | 107.5 |

In Example 1, the change rates in electrostatic capacitance and ESR were smaller than those in Comparative Examples 1 and 2. This is considered to be because, in Example 1, the voids of the first layer were filled with the second conductive polymer that is the self-doped conductive polymer. Form this, it was considered to be suppressed that the air came into contact with the solid electrolyte layer and thus the conductive polymer was deteriorated. As a result, the heat resistance of the electrolytic capacitor was improved. In particular, in Comparative Example 2 in which the non-self-doped conductive polymer was used, the change rates in ESR and electrostatic capacitance were large. This is considered to be because, in the liquid composition of Comparative Example 2, the particle size of the conductive polymer was large and the permeability into the first layer was low.

The electrolytic capacitor according to one aspect of the present invention can suppress deterioration of the conductive polymer contained in the solid electrolyte layer even when exposed to a high-temperature atmosphere, and can suppress an increase in ESR. Further, the electrolytic capacitor can also suppress a decrease in capacitance. Thus, the electrolytic capacitor can be used for various applications in which high heat resistance of the electrolytic capacitor is required.

The invention claimed is:

1. An electrolytic capacitor comprising:
   an anode body;
   a dielectric layer disposed on the anode body; and
   a solid electrolyte layer disposed on the dielectric layer, wherein:
   the solid electrolyte layer includes a first layer including a first conductive polymer and a second conductive polymer, the first conductive polymer being a non-self-doped conductive polymer, the second conductive polymer being a self-doped conductive polymer,
   the first layer has voids in which the first conductive polymer is absent, and
   the second conductive polymer exists in at least part of the voids of the first layer.

2. The electrolytic capacitor according to claim 1, wherein:
   the solid electrolyte layer further includes the second layer covering the first layer, and
   the second layer includes the second conductive polymer and excludes the first conductive polymer.

3. The electrolytic capacitor according to claim 1, wherein:
the solid electrolyte layer further includes the second layer covering the first layer,
the second layer includes the second conductive polymer and the first conductive polymer, and
an amount of the second conductive polymer per unit volume of the second layer is greater than an amount of the second conductive polymer per unit volume of the first layer.

4. The electrolytic capacitor according to claim 1, wherein:
the solid electrolyte layer further includes the second layer covering the first layer,
the second layer includes the second conductive polymer and the first conductive polymer, and
an amount of the second conductive polymer per unit volume of the second layer is greater than an amount of the first conductive polymer per unit volume of the second layer.

5. The electrolytic capacitor according to claim 1, wherein:
the anode body has a porous part, and
at least part of the dielectric layer and at least part of the first layer are disposed in the porous part.

6. The electrolytic capacitor according to claim 2, wherein:
the anode body has a porous part,
at least part of the dielectric layer and at least part of the first layer are disposed in the porous part, and
at least part of the second layer is disposed outside the porous part.

7. The electrolytic capacitor according to claim 3, wherein:
the anode body has a porous part,
at least part of the dielectric layer and at least part of the first layer are disposed in the porous part, and
at least part of the second layer is disposed outside the porous part.

8. The electrolytic capacitor according to claim 4, wherein:
the anode body has a porous part,
at least part of the dielectric layer and at least part of the first layer are disposed in the porous part, and
at least part of the second layer is disposed outside the porous part.

9. A method for producing an electrolytic capacitor comprising:
preparing an anode body on which a dielectric layer is disposed; and
forming a solid electrolyte layer including a first conductive polymer and a second conductive polymer by adhering a liquid composition containing the second conductive polymer to a layer including the first conductive polymer after forming the layer including the first conductive polymer on the dielectric layer, the first conductive polymer being a non-self-doped conductive polymer, the second conductive polymer being a self-doped conductive polymer.

10. The method according to claim 9, wherein the layer including the first conductive polymer is formed by chemical polymerization and/or electropolymerization of a precursor of the first conductive polymer.

11. The method according to claim 9, wherein in the forming of the solid electrolyte layer, voids in which the first conductive polymer is absent are formed in the layer including the first conductive polymer so that the second conductive polymer exists in at least part of the voids.

12. The method according to claim 10, wherein in the forming of the solid electrolyte layer, voids in which the first conductive polymer is absent are formed in the layer including the first conductive polymer so that the second conductive polymer exists in at least part of the voids.

13. The method according to claim 11, wherein in the forming of the solid electrolyte layer, a first layer and a second layer are formed by adhering the liquid composition containing the second conductive polymer to the layer including the first conductive polymer, the first layer including the second conductive polymer and the first conductive polymer, the second layer including the second conductive polymer and excluding the first conductive polymer.

14. The method according to claim 12, wherein in the forming of the solid electrolyte layer, a first layer and a second layer are formed by adhering the liquid composition containing the second conductive polymer to the layer including the first conductive polymer, the first layer including the second conductive polymer and the first conductive polymer, the second layer including the second conductive polymer and excluding the first conductive polymer.

15. The method according to claim 11, wherein:
in the forming of the solid electrolyte layer, a first layer and a second layer are formed by adhering the liquid composition containing the second conductive polymer to the layer including the first conductive polymer, the first layer including the second conductive polymer and the first conductive polymer, the second layer including the first conductive polymer and the second conductive polymer, and
an amount of the second conductive polymer per unit volume of the second layer is greater than an amount of the second conductive polymer per unit volume of the first layer.

16. The method according to claim 12, wherein:
in the forming of the solid electrolyte layer, a first layer and a second layer are formed by adhering the liquid composition containing the second conductive polymer to the layer including the first conductive polymer, the first layer including the second conductive polymer and the first conductive polymer, the second layer including the first conductive polymer and the second conductive polymer, and
an amount of the second conductive polymer per unit volume of the second layer is greater than an amount of the second conductive polymer per unit volume of the first layer.

17. The method according to claim 11, wherein:
in the forming of the solid electrolyte layer, a first layer and a second layer are formed by adhering the liquid composition containing the second conductive polymer to the layer including the first conductive polymer, the first layer including the second conductive polymer and the first conductive polymer, the second layer including the first conductive polymer and the second conductive polymer, and
an amount of the second conductive polymer per unit volume of the second layer is greater than an amount of the first conductive polymer per unit volume of the second layer.

18. The method according to claim 12, wherein:
in the forming of the solid electrolyte layer, a first layer and a second layer are formed by adhering the liquid composition containing the second conductive polymer to the layer including the first conductive polymer, the first layer including the second conductive polymer and the first conductive polymer, the second layer including the first conductive polymer and the second conductive polymer, and an amount of the second conductive polymer per unit volume of the second layer is greater than an amount of the first conductive polymer per unit volume of the second layer.

19. The method according to claim 11, wherein:

particles of the second conductive polymer are dispersed in the liquid composition, and an average particle size of the particles is equal to or less than 800 nm.

20. The method according to claim 12, wherein:

particles of the second conductive polymer are dispersed in the liquid composition, and an average particle size of the particles is equal to or less than 800 nm.

* * * * *